United States Patent [19]

Dawson et al.

[11] Patent Number: 4,961,845

[45] Date of Patent: Oct. 9, 1990

[54] APPARATUS AND METHOD FOR FILTERING PARTICULATE MATTER FROM DIELECTRIC FLUIDS

[75] Inventors: John Dawson, Clovis; Eugene S. Carlson, Fresno, both of Calif.

[73] Assignee: Diajet, Inc., Fresno, Calif.

[21] Appl. No.: 289,205

[22] Filed: Dec. 23, 1988

[51] Int. Cl.[5] .............................................. B01D 35/06
[52] U.S. Cl. ........................................ 210/85; 210/89; 210/90; 210/232; 210/243; 210/443; 210/453; 210/489; 210/510.1; 204/302; 184/6.24; 184/108
[58] Field of Search .................... 210/85, 90, 243, 443, 210/89, 168, 171, 741, 742, 746, 748, 232, 453, 489, 510.1; 55/104, 105, 131, 137, 141, 215; 204/302, 305, 306, 186, 188; 324/553; 340/631; 184/6.24, 108; 123/198 AD, 198 D

[56] References Cited

U.S. PATENT DOCUMENTS

| | | |
|---|---|---|
| 2,329,098 | 9/1943 | Browing et al. ................... 324/553 |
| 2,349,992 | 5/1944 | Schrader ............................ 210/85 |
| 2,792,116 | 5/1957 | Lenz et al. ......................... 210/443 |
| 3,544,441 | 12/1970 | Griswold ........................... 204/186 |
| 3,893,828 | 7/1975 | Archer ................................ 55/104 |
| 4,302,310 | 11/1981 | Watson et al. .................... 204/302 |
| 4,594,138 | 6/1986 | Thompson ........................ 204/302 |
| 4,626,344 | 12/1986 | Fick et al. ......................... 210/90 |
| 4,629,334 | 12/1986 | Hochstein ......................... 184/108 |
| 4,800,011 | 1/1989 | Abbot et al. ...................... 204/302 |
| 4,852,693 | 8/1989 | Nakajima et al. ................. 184/108 |

Primary Examiner—W. Gary Jones
Assistant Examiner—Matthew Savage
Attorney, Agent, or Firm—Blakely, Sokoloff, Taylor, Zafman

[57] ABSTRACT

The present invention is an apparatus and method for filtering particulate matter from dielectric fluids, and for maintaining and monitoring of the purity of said fluids. The invention operates by imparting an electrostatic charge, via a pair of convoluted perforated oppositely charged electrodes, to the particulate contaminates contained in the fluid. The positive electrodes and negative electrodes are each unitary and in combination with a filter media form a unitary cartridge which is removable and replaceable within the apparatus. A microcontroller may be provided to monitor, analyze and report certain parameters of the fluid to be filtered.

41 Claims, 3 Drawing Sheets

APPARATUS AND METHOD FOR FILTERING PARTICULATE MATTER FROM DIELECTRIC FLUIDS

BACKGROUND OF THE INVENTION

1. Field of the Invention

The present invention is an apparatus and method for filtering particulate matter from dielectric fluids, and for maintaining and monitoring of the purity of said fluids. The invention works with dielectric fluids used for combustion, lubrication and compression in pressurized systems.

2. Art Background

Numerous methods, compositions, devices and apparati have been conceived for the removal of fine particulate contaminants from dielectric fluids. Prior electrostatic filtration devices have embraced the concept of passing the fluid sought to be purified over, around or through charged electrodes. In the prior art it is known that porous filter media may be located along or between oppositely charged adjacent electrodes to trap fine particles, the susceptibility of which to deposition within said media is enhanced by the electrostatic charge of the particles. Alternatively, the prior art demonstrates that the filter medium itself may be charged to enhance collection of the particulates sought to be removed.

Most of the inventions of the prior art teach the flow of the dielectric fluid through a vessel which is in some manner punctured in order to allow the passage of electrical current from an external current source through the wall of the vessel. This punctured-vessel design has prevented the development of inexpensive or easily mass produced filters in a design capable of withstanding high pressure without fluid leakage. Such prior art filters could not be inexpensively constructed and also purify dielectric fluids under pressure without resorting to a bypass system whereby the fluid is bled or trickled away from the primary path to a filter located off the high pressure line. These bypass system prior art filters do not teach the placement of the filter in the primary fluid stream on the high pressure side of a pressurized system.

For example, in Watson, U.S. Pat. No. 4,302,310, the central charging module is of radial configuration, with perforated walls. Watson requires a nut to perform the function of fluid containment. The same assembly attaches the electrodes and contains the fluid.

Thompson, U.S. Pat. No. 4,594,138, depicts likewise a cylindrical housing in which the cylinder wall of the fluid containment housing contains studs connecting the alternately charged plates. This necessitates the perforation of the wall of the containment vessel. The failure of this design, as in Watson, to segregate the fluid containment function from the charging apparatus makes this design impossible to let the charging of the fluid accomplished by a separate disposable unit.

Griswold, U.S. Pat. No. 3,544,441 allows by design for a separation of the charging element from the fluid containment vessel. There is a central disposable filter pack which is removable, as in the present invention. The difference, however, is due to the fact that Griswold is a radial filter, which poses a major disadvantage. The Griswold filter allows the fluid to pass radially through the filter medium and along the electrode plates, which results in a single pass through the porous medium before the fluid exits through the outlet of the container.

Thus, no filter in the prior art allows for multiple charging via a filter element which is independent of the need to perform the function of fluid containment.

The lack of a cheap disposable module containing the porous filter medium in the prior art has not made it possible to systematically collect and recover the particulate matter contained therein without complicated disassembly of the wired electrodes. This has made the recycling of metals and other particulates contained in the porous medium of the filters described in the prior art a time-consuming and impractical task.

All of the filters in the prior art charge the fluid passing therethrough with a plurality of electrodes, which must be wired together either in series or in parallel. This electrical wiring requirement poses the risk of short circuits and/or broken circuits. The wiring of the prior art filters has presented difficulties in fabrication in that a buss bar, wire or other separate electrical attaching system is required to link together the plurality of electrodes.

Watson, for example, involves a rather complicated system of electrical connection. FIG. 3 and 4 of the drawings of Watson depict the conduction path. At 106a the electrode is attached to a stud, 117. This requires a separate attachment process. This design also requires the piecemeal composition, building block style, of the housing due to the need to place the annular rings or foam and electrodes in one at a time.

Thompson, likewise, accomplishes electrostatic charging via a pair of bus bars which are connected to each individual plate with pins (Thompson, FIG. 3 at numbers 54, 68, 72, and 50.)

The same can be said of Griswold. At page four, lines 33 through 44, a system of numerous electrical connecting components is described.

While many of the electrostatic filters of the prior art have been effective in the removal of fine particles, all have suffered from the lack of any control mechanism to monitor and operate them. This fact has limited the availability of electrostatic filtration in mobile and remote applications, as well as in fixed applications where changing conditions of use would make desirable real time or recurrent monitoring and ongoing control.

Therefore, it would be useful to provide an improved electrostatic filter which could be used in the high pressure lines of high pressure systems; which could utilize a replaceable element of simple, reliable, and inexpensive construction which need not itself be pressure resistant, and which could be fabricated without the need for any wiring; which could contain a module containing the trapped particulates which is easy to access and disassemble; and which could give feedback allowing its status to be monitored and its operation controlled cybernetically and in real time, in remote, in fixed, and in portable applications.

SUMMARY OF THE INVENTION

The present invention is an apparatus and method for filtering particulate matter from dielectric fluids, and for maintaining and monitoring of the purity of said fluids. The invention works with dielectric fluids used for combustion, lubrication and compression in pressurized systems. The invention involves the purification of, and monitoring and control of the purification of, inter alia, diesel fuel, hydraulic fluid, transformer oil and lubricating oil. However this description of the dielectric fluids subject to the claimed method is illustrative and not intended to be limitative. Both gaseous and liquid fluids are within the scope of the instant invention. The contaminants removable with this system include, but are not limited to, metals and carbon.

The invention operates by imparting an electrostatic charge, via a pair of convoluted perforated oppositely charged electrodes, to the particulate contaminates contained in the fluid. The fluid passes axially through the perforations in the plates, and the alternating positive and negative charge causes the attraction and clumping of the particles because each of them accepts either a positive or a negative charge. Each particle, after being charged and clumping together with oppositely charged particles, creates an aggregate which is deposited into a porous filter medium occupying the recesses of the convoluted perforated plates. The method and apparatus works for both large particles and particles as small as three microns, and possibly smaller.

The instant invention, as opposed to Griswold, utilizes a multi-pass filter element. The fluid passes through a series of perforated plates and a multiplicity of zones of trapping media, which may be varied in porosity or composition. For example, the first zones of foam with which the fluid comes into contact can be of large porosity, so as to trap large particles, with later zones being of finer porosity. The axial fluid path allows for a multiple charging and re-charging of the particles, causing a progressive aggregation and flocculation which cannot be achieved in a single pass.

Another aspect of the present invention involves the coupling of the charged particle filtration method described above to an electronic control and monitoring system. The monitoring is performed by a control head which enables the user to know the purity of the fluid subject to the filtration system, to be warned in the event the contamination in the fluid increases beyond predetermined acceptable limits, to know when to perform progressive maintenance at predetermined intervals aby changing the disposable filter material and to detect and report any extreme events, such as sudden contamination, which may indicate the occurence of serious problems in the system bathed by the hydraulic fluid to be filtered.

It is an object of the present invention to provide an apparatus for the filtration of particles from dielectric fluids which contaminate said fluids which is an improvement over the prior art.

Another object is to provide a filter whereby the fluid containment vessel is by design separate form the component containing the electrodes which charge the fluid, whereby the fluid containment function can be met by a seamless vessel of superior pressure resistance.

Another object is to provide a filter whereby the imparting of opposite electrical charges to the fluid passing therethrough is achieved via a module of axial design which is easily removable, thereby making it easy to use and service.

Another object is to provide a filter whereby the imparting of opposite electrical charges to the fluid passing therethrough is achieved while the fluid is under pressure with a charging module which itself is not required to resist high pressures.

Another object is to provide a filter whereby the imparting of electrical charge to the particulate matter sought to be eliminated from the dielectric fluid is accomplished by passing said liquid axially through the numerous perforated planar surfaces of each complimentary member of a single pair of oppositely charged electrodes, disposed in an array in a convoluted fashion, thereby completely obviating the need for numerous sets of oppositely charged separate electrical plates linked by an electrical connecting system.

Another object is to provide a filter having a porous medium containing the trapped particulates which medium is easily removable by virtue of their containment in a disposable and quickly removable element, thereby facilitating the hoarding of those particulates.

Another object is to provide a filter having a porous medium that can be inserted easily and en masse into a fusing mechanism for the assembly of the same.

Another object is to provide a filter whereby its essential functions, and, additionally, the purity and other conditions of the dielectric fluid being filtered, can be monitored recurrently or in real time.

Another object is to provide a filter whereby its essential functions, and the purity and other conditions of the dielectric fluid being filtered, can be recorded and trends appertaining thereto thereby ascertained.

Another object is to provide a filter whereby its essential functions, can be cybernetically controlled.

DESCRIPTION OF THE INVENTION

The principle of operation of the filter system is as follows: Any solid substance in a dielectric fluid will accept a either a positive charge or a negative charge. A dielectric fluid, such as lubricating oil, diesel fuel, or hydraulic fluid, by virtue of its dielectric nature, does not accept a charge. Such fluids operate as an insulator and support medium through which charged particles migrate as they flock together forming larger clumps.

The charging method is known in the prior art. The details of the charging process are irrelevant to the operation of the present invention, and the charging process is completely random. Some particles, because of their chemical composition, accept a positive charge, while others accept a negative charge. Because virtually every solid particle typically found in the dielectric fluids to be filtered will accept one or the other charge, every particle becomes capable of attraction to an oppositely-charged particle. This mutual attraction of the contaminant particles causes them to aggregate in clumps. As the fluid passes through the filter medium, which is preferably foam rubber and which occupies the spaces between the alternately charged plates used to charge the particles, those clumps continue to aggregate, growing larger and larger. Finally they become too big to pass through the filter medium and become lodged therein. The fluid continues to pass through this series of plates and foam, receiving continuous alternating charge and leaving the contaminants stuck in the foam, with no free particles remaining in solution. The result is a clean fluid.

In the preferred embodiment of the present invention, it has been the goal of the present invention to be easy to use and of simple and reliable construction. This design objective is achieved by employing injection molding for the filter housing and disposable electrode cartridge, and by eliminating a separate electrical connecting system from the electrodes. The disposable portion of the filter consists of but grams of plastic, and two folded strips of stamped, perforated aluminum, interspersed with foam rubber.

The design provides a filter in which the charging is achieved by passing the fluid through the filter while it is under pressure, whereby that charge is imparted with an electrode module which itself is not required to resist high pressure. This is a very important consideration in a hydraulic system, because it allows for alternative installation schemes. Due to the design of the invented filter housing, it could easily be constructed with thick walls so as to serve as a high pressure containment vessel. This means that the filter could be installed on the pressure side of a high pressure hydraulic system without the need for a separate fluid delivery system.

However, the invented filter may otherwise be designed to be installed in a separate trickle system which would be off line; which would purify the hydraulic fluid by bleeding it from the reservoir, filtering it, and returning it. This would require the addition of a trickle pump which is well known in the art.

A primary design objective has been to provide a filter whose essential functions can be measured, and whose performance trends can be recorded by an electronic control head. The level of particulate contaminants in hydraulic fluid, engine oil, and diesel fuel is a significant predictive factor in the life expectancy of the equipment which uses those fluids.

For example, laboratory analysis of lubricating oil is a well known technique for gauging the condition of an engine. Although under normal conditions of continuous filtration there will be no contaminants to monitor, in the event of any sudden decay in fluid purity, it will be detected by the control head immediately. Any sudden wear in a mechanical system causing the deposition of particles into that machine's fluid system will be called to attention by a spike in the recorded purity value. Likewise, any sudden infiltration of particulate contaminants from an external source will be detected.

Trend monitoring is achieved by measuring the variance in current in the system. Because dielectric strength diminishes as the level of contaminants increases, the contaminant level can be indicated by measuring the dielectric strength through changes in current.

The electrical charge which is applied to the fluid is of very high voltage. This is achieved by taking 24 volts DC and stepping it up to 12,500 volts by running the current from its source, a battery, through a high voltage power supply (for brevity, "H.V.P.S."). By way of definition, the current flowing into the H.V.P.S. is the primary current, and that flowing out is the secondary current. The primary circuit is the 24 volt DC input to the H.V.P.S. and the secondary circuit is the 12.5 kilovolt DC output of the H.V.P.S.

Because dielectric strength is inversely proportional to the presence of particulate matter, and because it is measured by changes in current, its degradation may be detected by determining the primary current as a reflection of the secondary current. The secondary is where the current changes occur due to fluid contamination. Changes in the secondary current are mirrored by changes in the primary current.

The secondary current is determined by measuring the primary current and then multiplying it by the efficiency factor of the conversion from the low voltage primary to the high voltage secondary. When converting a low voltage to a high voltage, the power in the primary circuit is always equal to the power in the secondary circuit, after taking into account the efficiency factor. It is axiomatic that power, assuming 100% efficiency in transmission, is neither created nor destroyed.

The power is equal to the voltage times the current in each circuit. As the dielectric strength of the oil is degraded, the power consumed in the secondary circuit increases. Thus the power in the primary circuit also increases.

The power change in the primary circuit can be measured as a function of voltage and current. Because the voltage from the battery in the primary circuit remains constant (24 volts) the current in the primary circuit increases. The current in the primary circuit is sensed in an auxiliary circuit as a voltage across a constant resistance, with voltage varying in proportion to the current flowing through the resistance. As the current increase the voltage increases, and vice versa. The voltage across the constant resistance is the input which the control head uses to monitor fluid purity. This input is referred to herein as "current sense."

The resistor in the auxiliary circuit providing current sense is connected from the negative terminal of the primary supply (24 volts DC) to the negative input of the primary circuit. By registering the change in voltage along the resistance, current sense is generated as an analog signal which becomes digitized and capable of being processed in the microcontroller. The current sense input passes through an analog-to-digital-converter, and then into the microcontroller. The value received by the microcontroller is compared to known standards, and the contaminant level of the fluid is thereby ascertained and monitored in real time.

Because of the time dimension, a historical trend can be recorded in the eeprom memory (electronically erasable programmable read-only memory) built into the control head. This is an actual day by day log, taken in real time, of the quality of the oil, fuel, or hydraulic fluid being used on the machine attached to thefilter. With this technique one can become apprised of dangerous trends and arrest them before they reach a critical state.

Due to the digital operation of the filter through the control head, and its ability to monitor the filter's purification performance, certain possibilities of control through firmware are presented which would not be possible with a non-intelligent device. At every juncture where a design alternative has presented itself, firmware control has been elected as against hardware control.

The firmware is contained in the eeprom memory of the control head. Through the firmware the essential functions of the filter can be controlled remotely, automatically, and optimally as indicated by the feedback indicating fluid status Which the control head receives. For example, if a primary filter system becomes incapable of adequate filtration, due to a sudden and massive introduction of contaminants, a reserve system can come on-line. As another example, if the control head senses a catastrophic introduction of contaminants, a message can be sent to the user which would suggest shutting down the engine, hydraulic system, or performing a laboratory analysis. Due to the inherent plasticity of firmware, the parameters of control all can be tailored and modified.

Figure 7:
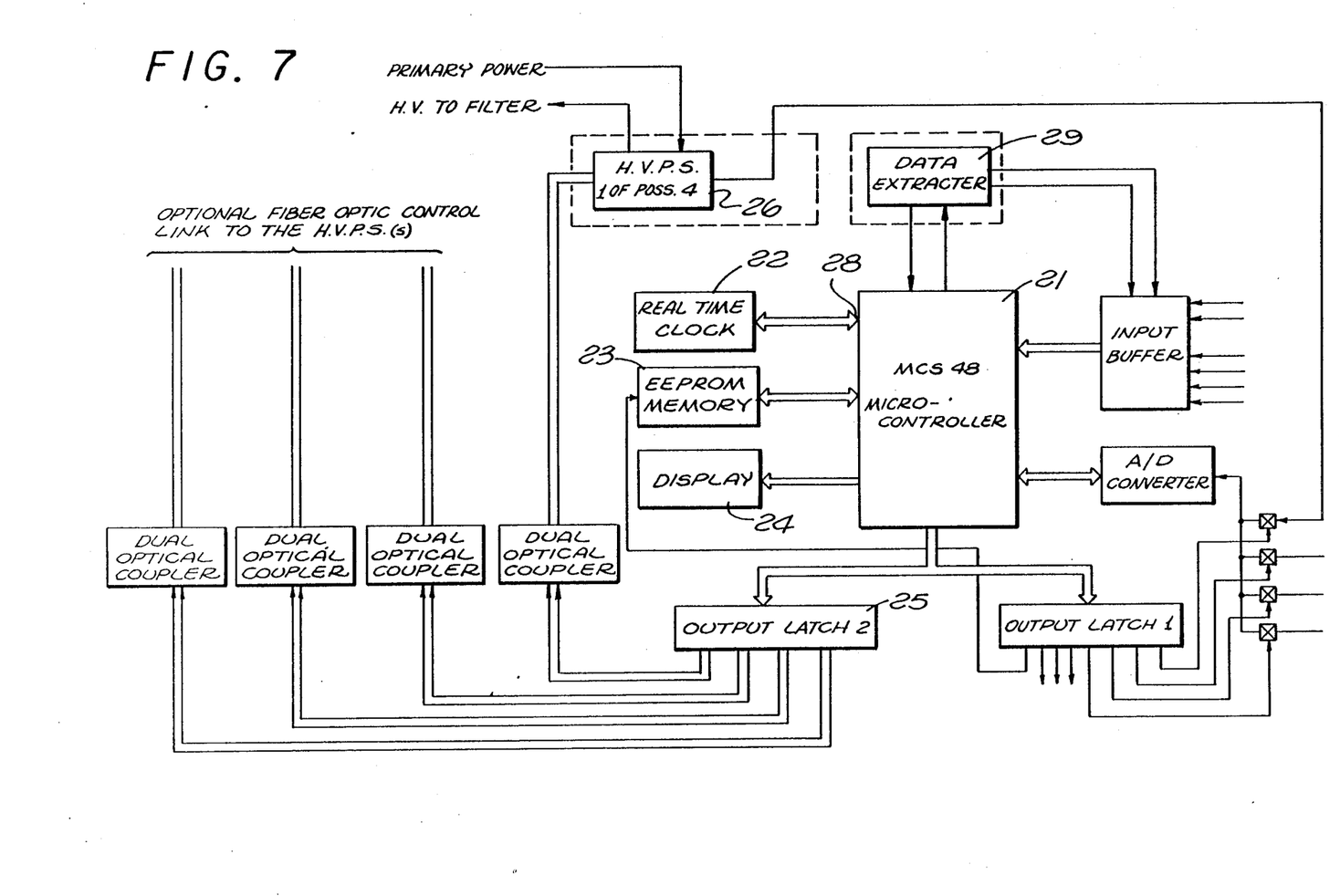
FIG. 7 shows in block diagram the control system providing for digitized monitoring and control of four separate fluid filters.

The invention as to which we wish to secure letters patent is described in greater detail below. FIG. 7 shows in block diagram the control system providing for digitized monitoring and control of four separate fluid filters. At the heart of FIG. 7 is the microcontroller, shown at (21), which has access at (22) to a real time clock, and at (23) to eeprom memory. The functioning of the microcontroller is governed by an alpha-numeric display shown at (24). At (25) is the first output latch which controls one or more high voltage power transformers which step up the voltage from 24 volts, thus yielding high voltage output to the electrodes.

The lines leading from the first output latch 25 send clock and data signals to the high voltage power supplies 26. The output from the output latch switches the H.V.P.S. on or off. The switch position depends on the data returned from the H.V.P.S. to the microcontroller. The secondary current reading communicated from the H.V.P.S. to the microcontroller is compared to the empirically determined standard programmed into the firmware. As the dielectric strength is directly related to the absence of particulate matter, the degradation of dielectric strength of the fluid passing through the filter may be detected by determining the secondary current as a function of the primary and comparing that ratio to the empirically determined standard. If the filter is clean enough to give the fluid a level of dielectric strength consistent with the specifications as represented by the values programmed into the variables of the firmware, the switch to the H.V.P.S. remains on.

The real time clock 22 inputs date and time into the microcontroller so that the filters may be shut down at the service intervals recommended. The critical limits compelling the changing of the filter element, whether imposed by time or by fluid contamination, preferably will not be exceeded. Clock data is thus an additional input for control which supplements the dielectric strength degradation measurement which enters the microcontroller digitally as shown in (28).

Another advantage of the digitized control is that the various filters for which power is administered via microcontroller may be placed in the fluid stream in series, coming on line only as needed. This is determined by a change in dielectric strength of a pre determined level, which is indicative of the empirically determined limit of particulate degradation for the dielectric fluid in question. The control head compares the value received against a known standard.

Yet another advantage of microcontroller operation is the ability to define separately for each filter what the parameters of control are, depending on what the filter is filtering. If experience indicates that the disposable cartridge needs to be changed more frequently on the diesel line than on the hydraulic system of a given vehicle, the diesel fuel filter can be operated independently through the firmware.

The microcontroller can record more than just readings of dielectric strength. It can utilize other information relevant to the trend monitoring of the machine utilizing the dielectric fluid being purified. Such other relevant digitizable information includes pressure and heat readings, which are obtained by placing a pressure transducer and thermocouple in the filter housing in a manner allowing their outputs to interface with the H.V.P.S. through molded-in jacks. All such digitized information is taken in real time and recorded in the microcontroller in relation to the value provided by the real time clock (22).

Shown at (29) is a data pack, referred to as the data extractor, which extracts data from the control head, and inputs data externally provided back into the control head, or into a computer. It is a hand held module, roughly the size of a cigarette pack, employing a serial or similar port for data input and output. The stored historical readings of the trend monitoring system, consisting of digitized information, are withdrawn from the control head via the data extractor. This information than then be ported to other electronic devices and put to use. For example, the information could be stored in a microcomputer from which it can be printed or graphed.

Information can be fed back into the microcontroller 21 and its eeprom 23 via the data extractor 29. Should the operator of the system desire to change the dielectric strength value determinative of when additional serial filters come on line, those values, residing in the eeprom for access by the microcontroller, can be altered upon command from the data extractor. This can be adminstered from a remote source with the addition of a modem.

The data extractor adds useful flexibility. For example, it can be used to compile a digital maintenance history, showing how pure the engine oil, fuel, etc. have been for a given period. This information can be drawn from the control head's memory into the data extractor, and dumped into a personal computer. Three trend lines—purity of the diesel fuel, hydraulic fluid, and engine oil—may be plotted on a graph. Temperature and pressure trend lines may also be included. It would require nothing more complicated than the annual exchange of the loaded data extractor containing that year's data for a blank data extractor. The annual maintenance report may be a valuable sales tool which could be created at little additional cost.

Returning the loaded data device for a new blank once a year can be made an element of warranty compliance. Because the data device both extracts data and submits new data into the programmable memory of the control head, progressive maintainence of the device whose dielectric fluids are being purified becomes simplified.

Figure 2:
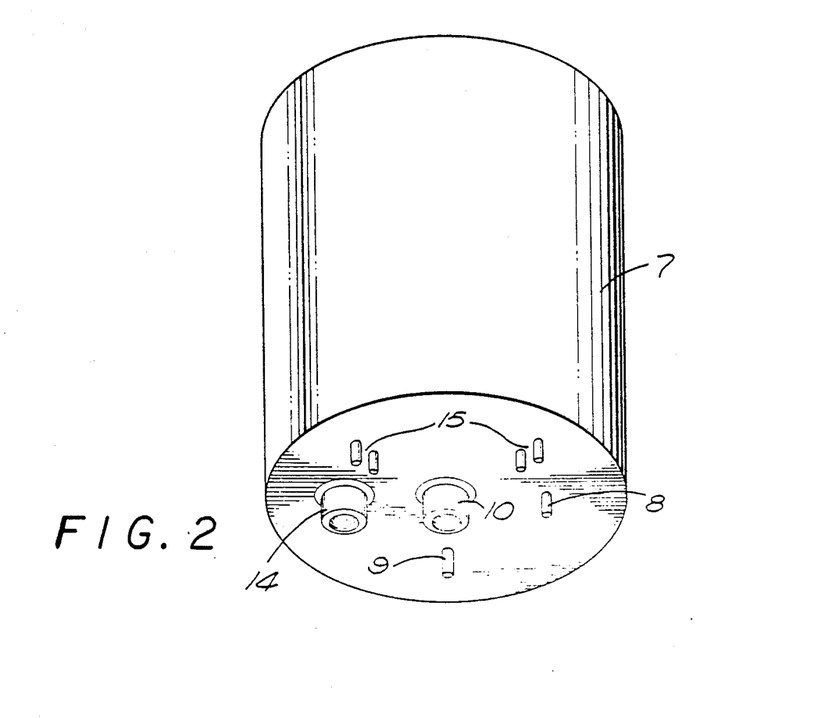
FIG. 2 is a bottom perspective view of the present invention showing the oter casing and various connection ports.

FIG. 2 shows the filter element, which is made of injection molded plastic. At (1) the positive electrode is shown in cutaway view. The negative electrode is shown at (2). The next section of the plate down the column is positive, and the next negative, etc.

Figure 4:
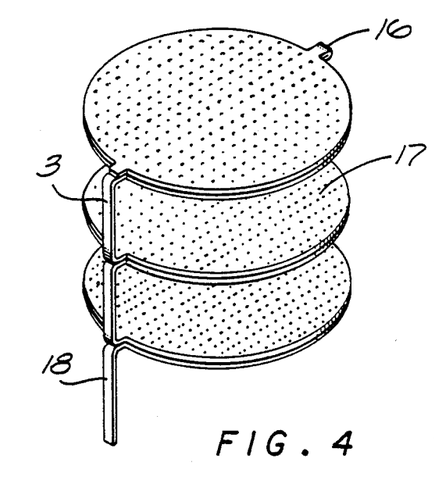
FIG. 4 shows one of the two folded electrode units (either positive or negative) removed from the cartridge.

This convolution of the two electrodes is shown in greater detail in FIG. 4. The portion of the stamped metal connecting each level with the section of the plate at the next level, the connecting tab, is spaced within the channels of the plastic inner casing shown at (5) so as to allow it to be insulated from the edge of the complementary section of the oppositely-charged plate. This avoids shorting.

The tab portion of the convoluted plate used soley to convey the current to the next axially-arrayed, charged perforated level planar surface is displayed at (3). It is arrayed in parallel to the flow in the aforementioned channel of the inner case (5). The folded plates which interlock but do not touch, sending alternate charges of positive and negative, are made of simple, cheap, stamped and perforated aluminum sheeting.

At (4) the reticulated foam rubber is shown. It resides within the filter case (5), and the latter resides within the pressure resistant container, (7).

At the bottom of the case the molded-in contact terminals are shown, (8) being the negative and (9) the positive. Downward spring pressure from the container cap, (13), causes the entire filter case component with electrodes and foam to impinge on the terminals, with the folded portion of the positive and negative electrodes at the anterior end making contact with the terminals.

Fluid flow is accomplished by entry through the tube at (10) which is sealed with an "O" ring which is shown, impinging on the female wall of the outlet (14) and the male end of the filter case (5). The outlet flow passage is shown at (11). The outlet is through another tube (not shown) such as (14).

Pressure is maintained via another "O" ring at the top, connecting the container cap (13) to the inner wall of the container (6). The cap is held in place with a snap ring (14).

Figure 1:
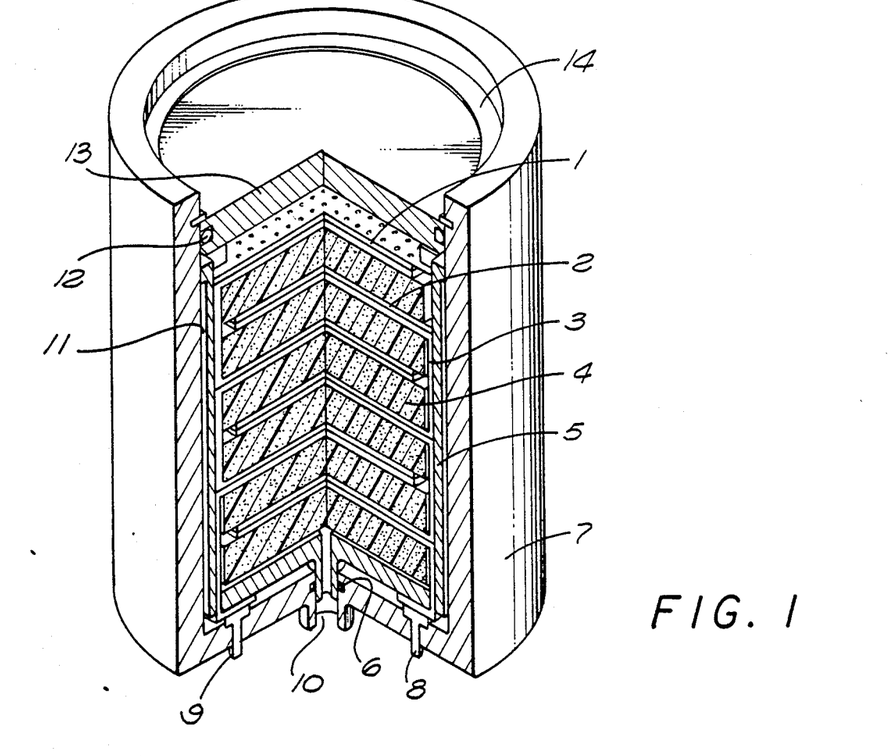
FIG. 1 is a cutaway perspective view of the invented filter assembly showing the interior thereof.
Figure 3:
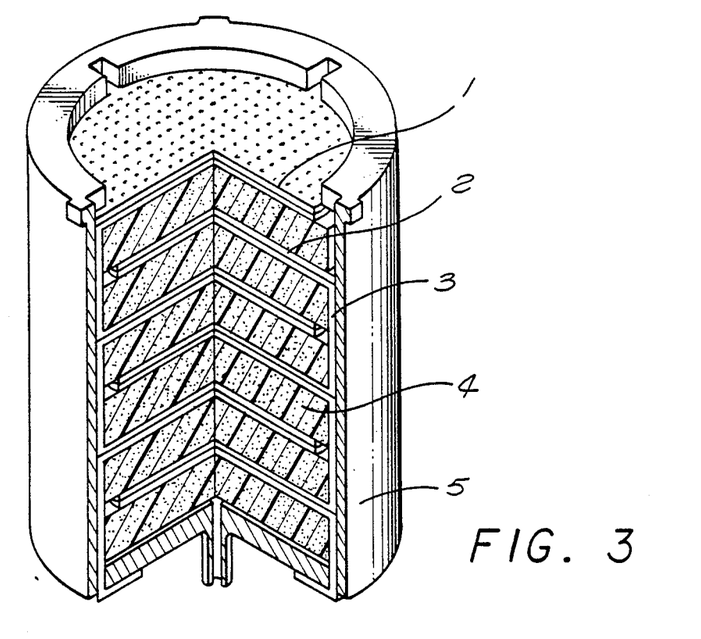
FIG. 3 is a cutaway upper perspective view of the replaceable cartridge of the invented filter assembly.

FIG. 3 shows the filter cartridge which is captive to the container shown as element (7) at FIG. 1. At (1) is the positive electrode and at (2) is the negative electrode. The conductor is shown at (3) and is nothing more than a thin portion of the stamped and perforated aluminum plate which is convoluted and folded into one of the two oppositely charged electrodes. The reticulated foam which traps the charged particles, which clump and grow larger by charge induced migration (flocculation), is shown at (4). At (5) the wall of the filter case is shown.

Figure 5:
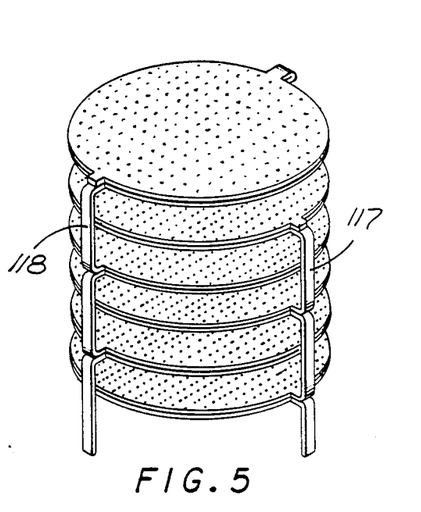
FIG. 5 shows the entire electrode assembly of the present invention removed from the cartridge.

FIG. 4 shows one of the two folded electrode units. The perforations are plainly visible on each of the level planar surfaces which are round. FIG. 5 shows generally how the companion electrodes 117 and 118 (oppositely charged) can be interleaved and arrayed in sucn a fashion as to prevent the shorting of the edge of one planar surface with the conductor portion of the opposite electrode. This is accomplished by arraying the electrodes axially and rotating them ninety degrees.

The conductor shown at (3) on FIG. 3 is labeled as (3) again on FIG. 4. At (18) is the contact extension which makes electrical contact with the stud which passes through the wall of the container and is shown on FIG. 1 at (8) and (9). One stud is a positive terminal and the other a negative terminal.

Figure 6:
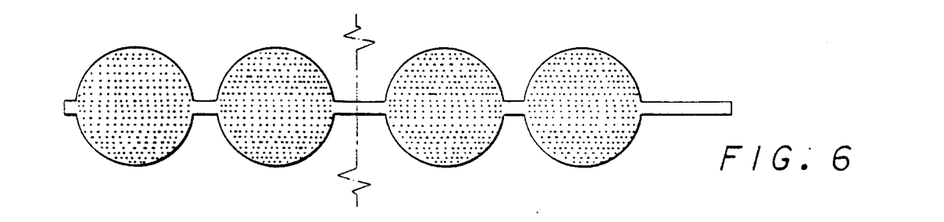
FIG. 6 is a top view of the one of the electrode assemblies as shown in FIG. 4 in an unfolded view.

At (16) on FIG. 4 is the fold which allows the electrode to be fabricated out of a single piece of stamped sheet metal as shown on FIG. 6.

FIG. 2 shows the bottom of the container. The inlet is at (10). The outlet is at (14). The instrument terminals are shown at (15). There are jacks that are molded into the plastic of hte container, so as to avoid the leaking that might result if the jacks screwed in. The terminals, (8) and (9,) are also molded in place. The external terminals are all male, so as to allow the H.V.P.S. to be attached as a snap-on unit.

The device operates by causing the dielectric fluid to move through the inlet into the filter housing into the chamber of the filter (See FIG. 1, inlet 10.) The fluid then moves through the sandwich of alternating positive plate, reticulated foam, negative plate, reticulated foam, positive plate, etc. See FIG. 3. The electrodes and sucessive chambers of reticulated foam filter and re-filter the fluid, so that by the time the fluid reaches the top of the cartridge, shown at 1 on FIG. 3, the particulates are eliminated.

The flow of the fluid through the cartridge is axial, but it exits the chamber in radial fashion as can be seen in figure one. There is a gap between the outside edge of the cartridge and the inside edge of the housing allowing for the fluid to exit through an aperture not shown, also located at the bottom of the housing.

The electrical charge to each unitary electrode assembly, the positive charge and negative charge, comes from the high voltage power supply (H.V.P.S.) which is a separate assembly that attaches to the bottom via screw on jacks. (See FIG. 2, 15.)

It will be obvious to a person of ordinary skill in the art that a number of changes can be made to the subject invention without departing from the spirit and scope of the present invention as defined by the claims appended hereto and all equivalents thereof.

What we claim is:

1. A filter for removing paricles from fluids in a fluid system comprising:
   a housing having an internal chamber and providing an inlet portion and an outlet portion, the inlet portion being connected in fluid-flow relation to a portion of the fluid flow system for delivery of fluids from the fluid system into the internal chamber, and the outlet/portion being connected in fluid flow relation to a portion of the fluid system for discharge of the fluid from the internal chamber to the fluid system;
   a first and second electrode assembly, each electrode assembly comprising a convoluted unitary member having a plurality of electrically conductive electrodes spaced axially of each other within the internal chamber and having electrically conductive tab means for interconnecting the electrodes, each electrode having a substantially flat body providing a multiplicity of bores of predetermined dimensions therethrough, said electrodes being disposed substantially transverse to the path of fluid flow, and electrodes from said first electrode assembly being disposed in an alternating relation with electrodes of said second electrode assembly;
   porous filter media disposed between adjacent electrodes, said filter media having a multiplicity of passages therethrough for flow of fluids through the passages and capturing of particles therein;
   a positive and negative electrical source; and
   a positive and a negative electrode connector disposed through said housing, said positive electrode connector electrically connected to said first electrode assembly and said positive electrical source and said negative electrode connector electrically connected to said second electrode assembly and said negative electrical source.

2. The filter of claim 1 wherein the electrode assemblies and the filter media comprise an integral removable member disposed in said housing.

3. The filter of claim 1 wherein said inlet portion comprises a cylinder centrally disposed in said housing, and said outlet portion comprises an annular passages within said housing and outside said inlet portion.

4. The filter of claim 1 wherein said filter media comprises reticulated foam.

5. The filter of claim 1 further comprising means for detecting changes in dielectric strength of said fluid over time.

6. The filter of claim 5 wherein said means for detecting changes in dielectric strength of said fluid comprises means for determining power supplied to the electrodes and means for comparing said power to a predetermined value.

7. The filter of claim 6 wherein said power determining means and said comparing means are provided by a microcontroller.

8. The filter of claim 1 further comprising a means for determining pressure of the fluid within said housing, means for determining change of pressure over time, and means for comparing said change of pressure against a predetermined value to determine when the pressure of the fluid within said housing is sufficiently diminished to require replacement of said electrode assemblies and said filter media.

9. The filter of claim 8 wherein said determining means and said comparing means comprises a microcontroller.

10. The filter of claim 1 further comprising electronic control means comprising means for detecting the purity of said fluid, clock means, means for determining purity of said fluid over time and means for comparing said purity of said fluid to a predetermined value and means for communicating when said fluid purity decreases below said predetermined value.

11. A filter for removing particles from dielectric fluids in a fluid system comprising:
a housing having an internal chamber and providing an inlet portion and an outlet portion, the inlet portion being connected in fluid-flow relation to a portion of the fluid flow system for delivery of fluids from the fluid system into the internal chamber, and the outlet portion being connected in fluid flow relation to a portion of the fluid system for discharge of the fluid from the internal chamber to the fluid system;
a first and second electrode assembly, each electrode assembly comprising a plurality of electrically conductive electrodes spaced within the internal chamber, each assembly applying a different charge to a dielectric fluid passing therethrough;
a porous medium spaced between adjacent electrodes, in relation to fluid flow in such a manner as to trap the particulate matter contained in the dielectric fluid; and
a positive and negative electrode connector disposed through said housing, said positive electrode connector electrically connected to said first electrode assembly and said positive electrical source and said negative electrode connector electrically connected to said second electrode assembly and said negative electrical souce; and
control means for detecting the purity of said fluid, clock means, means for determining purity of said fluid over time and means for comparing said purity of said fluid to a predetermined value and means for communicating when said fluid purity decreases below said predetermined value;
and means for detecting changes in dielectric strength of said fluid over time comprising means for determining power supplied to the electrodes and means for comparing said power to a predetermined value.

12. The filter of claim 11, wherein said means for determining purity of said fluid over time comprises said means for detecting changes in dielectric strength of said fluid over time.

13. The filter of claim 11, wherein the electrode assemblies and the filter media comprise an integral removable member disposed in said housing.

14. The filter of claim 11, wherein said inlet portion comprises a cylinder centrally disposed in said housing, and said outlet portion comprises an annular passages within said housing and outside said inlet portion.

15. The filter of claim 11, wherein the electrode assemblies and the filter media comprise an integral removable member axially disposed with respect to fluid flow within said housing.

16. The filter of claim 11, further comprising a means for determining pressure of the fluid within said housing, means for determining change of pressure over time, and means for comparing said change of pressure against a predetermined value to determine when the the pressure of the fluid within said housing is sufficiently diminished to require replacement of said electrode assemblies and said filter media.

17. The filter of claim 11, wherein said control means comprises:
a microcontroller;
a memory for storing historical values of the qualities of the dielectric fluid selected from pressure, temperature and dielectric strength measured against time.

18. The filter of claim 11, further comprising a means for detecting:
the temperature of said fluid in said housing; and
the pressure of said fluid in said housing.

19. The filter of claim 18, further comprising a means for displaying the temperature, dielectric strength and pressure of said fluid in said housing.

20. A filter for removing particles from dielectric fluids in a fluid system comprising:
a substantially cylindrical injected molded housing having an internal chamber and providing on one end thereof an inlet portion and an outlet portion, the inlet portion being connected in fluid-flow relation to a portion of the fluid flow system for delivery of fluids from the fluid system into the internal chamber, and the outlet portion being connected in fluid flow relation to a portion of the fluid system for discharge of the fluid from the internal chamber to the fluid system, said outlet portion being annularly disposed around said internal chamber and said housing further having a lid with snap ring, external snap on jacks for the transmission of power through said housing to electrodes therein, thermocouples and pressure transducers mounted inside said housing, and snap on jacks for the transmission of signal from said thermocouples and pressure transducers through said housing to a microcomputer;
a first and second electrode assembly, each electrode assembly comprising a convoluted unitary member having a plurality of electrically conductive electrodes spaced axially of each other within the internal chamber and having electrically conductive tab means for interconnecting the electrodes, each electrode having a substantially flat body providing a multiplicity of bores of predetermined dimensions therethrough, said electrodes being disposed substantially transverse to the path of fluid flow, and electrodes from said first electrode assembly being disposed in an alternating relation with electrodes of said second electrode assembly;

a porous filter medium disposed between adjacent electrodes, said filter media having a multiplicity of passages therethrough for flow of fluids through the passages and capturing of particles therein, said porous filter media and said first and second electrode assembly comprising a unitary member reversibly removable from said housing; and a positive and negative electrical source.

21. The filter of claim 20 further comprising a means for determining pressure of the fluid within said housing, means for determining change of pressure over time, and means for comparing said change of pressure against a predetermined value to determine when the pressure of the fluid within said housing is sufficiently diminished to require replacement of said electrode assemblies and said filter media.

22. The filter of claim 21 further comprising a means for detecting the temperature of said fluid in said housing.

23. The filter of claim 22 further comprising a means for detecting the dielectric strength of said fluid in said housing.

24. The filter of claim 23 further comprising a means for displaying the temperature, dielectric strength and pressure of said fluid in said housing.

25. The filter of claim 23, wherein said means for determining change of pressure over time and said comparing means comprises a microcontroller.

26. The filter of claim 20, further comprising a clock means for determining the length of time of operation of said filter.

27. The filter of claim 20, wherein said filter media comprises reticulated foam.

28. The filter of claim 20, wherein the dielectric strength of the fluid is monitored to determine when it achieves a predetermined value, and when said predetermined value is achieved, a notice signal is generated to indicate that said filter needs to be changed.

29. The filter of claim 20 further comprising a time control means for measuring the elapsed time said filter is in operation and displaying a warning when said elapsed time reaches a predetermined value.

30. The filter of claim 20 further comprising means for detecting the temperature of the dielectric fluid being filtered, means for comparing said temperature to a predetermined value and means for displaying a warning when said fluid temperature reaches said predetermined value.

31. A filter for removing particles from dielectric fluids in a fluid system comprising:

a housing having an internal chamber and providing an inlet portion and an outlet portion, the inlet portion being connected in fluid-flow relation to a portion of the fluid flow system for delivery of fluids from the fluid system into the internal chamber, and the outlet portion being connected in fluid flow relation to a portion of the fluid system for discharge of the fluid from the internal chamber to the fluid system;

a first and second electrode assembly, each electrode assembly comprising a unitary member having a plurality of electrically conductive electrodes spaced axially of each other within the internal chamber and connected together by electrically conductive tab means, each electrode having a substantially flat body providing a multiplicity of bores of predetermined dimensions therethrough, said electrodes being disposed substantially transverse to the path of fluid flow, and electrodes from said first electrode assembly being disposed in an alternating relation with electrodes of said second electrode assembly;

porous filter media disposed between adjacent electrodes, said filter media having a multiplicity of passages therethrough for flow of fluids through the passages and capturing of particles therein;

a positive and negative electrical source;

a positive and a negative electrode connector disposed through said housing, said positive electrode connector electrically connected to said first electrode assembly and said positive electrical source and said negative electrode connector electrically connected to said second electrode assembly and said negative electrical source; and means for detecting changes in dielectric strength of said fluid over time comprising means for determining power supplied to the electrodes and means for comparing said power to a predetermined value.

32. The filter of claim 31 wherein said power determining means and said comparing means are provided by a microcontroller.

33. The filter of claim 31 further comprising a means for determining pressure of the fluid within said housing, means for determining change of pressure over time, and means for comparing said change of pressure against a predetermined value to determine when the pressure of the fluid within said housing is sufficiently diminished to require replacement of said electrode assemblies and said filter media.

34. The filter of claim 33 wherein said determining means and said comparing means comprises a microcontroller.

35. The filter of claim 31 further comprising electronic control means comprising means for detecting the purity of said fluid, clock means, means for determining purity of said fluid over time and means for comparing said purity of said fluid to a predetermined value and means for communicating when said fluid purity decreases below said predetermined value.

36. The filter of claim 31 further comprising a means for displaying the temperature, dielectric strength and pressure of said fluid in said housing.

37. The filter of claim 31, further comprising a clock means for determining the length of time of operation of said filter.

38. The filter of claim 31, wherein said filter media comprise reticulated foam.

39. The filter of claim 31, wherein the dielectric strength of the fluid is monitored to determine when it achieves a predetermined value, and when said predetermined value is achieved, a notice signal is generated to indicate that said filter needs to be changed.

40. The filter of claim 31 further comprising a time control means for measuring the elapsed time said filter is in operation and displaying a warning when said elapsed time reaches a predetermined value.

41. The filter of claim 31 further comprising means for detecting the temperature of the dielectric fluid being filtered, means for comparing said temperature to a predetermined value and means for displaying a warning when said fluid temperature reaches said predetermined value.

* * * * *

UNITED STATES PATENT AND TRADEMARK OFFICE
CERTIFICATE OF CORRECTION

PATENT NO. : 4,961,845

DATED : 10/9/90

INVENTOR(S) : Dawson et al.

It is certified that error in the above-identified patent and that said Letters Patent is hereby corrected as shown below:

| col. 08, line 13 | after "the" (first occurrence) | insert --time-- |
| col. 09, line 47 | delete "sucn" | insert --such-- |
| col. 09, line 64 | delete "hte" | insert --the-- |
| col. 10, line 35 | after "outlet" | delete "/" |

Signed and Sealed this

First Day of December, 1992

Attest:

DOUGLAS B. COMER

Attesting Officer

Acting Commissioner of Patents and Trademarks